(12) United States Patent
Uchida et al.

(10) Patent No.: US 11,294,145 B2
(45) Date of Patent: Apr. 5, 2022

(54) IMAGING DEVICE, IMAGING METHOD, AND PROGRAM CAPABLE OF SUPPRESSING DECREASE IN AUTOFOCUSING ACCURACY

(71) Applicant: FUJIFILM Corporation, Tokyo (JP)

(72) Inventors: Akihiro Uchida, Saitama (JP); Koichi Tanaka, Saitama (JP); Kenkichi Hayashi, Saitama (JP); Shinichiro Fujiki, Saitama (JP); Seiichi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/933,940

(22) Filed: Jul. 20, 2020

(65) Prior Publication Data

US 2020/0348490 A1  Nov. 5, 2020

Related U.S. Application Data

(63) Continuation of application No. PCT/JP2018/036922, filed on Oct. 2, 2018.

(30) Foreign Application Priority Data

Jan. 25, 2018 (JP) .............................. JP2018-010738

(51) Int. Cl.
*G02B 7/28* (2021.01)
*G02B 7/09* (2021.01)
(Continued)

(52) U.S. Cl.
CPC ............... *G02B 7/282* (2013.01); *G02B 7/09* (2013.01); *G03B 5/00* (2013.01); *G03B 13/36* (2013.01);
(Continued)

(58) Field of Classification Search
CPC . G02B 7/282; G02B 7/09; G02B 7/36; G03B 5/00; G03B 13/36;
(Continued)

(56) References Cited

U.S. PATENT DOCUMENTS 8,320,755 B2  11/2012  Nakamura
8,374,497 B2   2/2013  Nakamura
(Continued)

FOREIGN PATENT DOCUMENTS

CN  101931752  12/2010
CN  102262334  11/2011
(Continued)

OTHER PUBLICATIONS

"International Search Report (Form PCT/ISA/210) of PCT/JP2018/036922," dated Jan. 8, 2019, with English translation thereof, pp. 1-4.
(Continued)

*Primary Examiner* — Jason A Flohre
*Assistant Examiner* — Angel L Garces-Rivera
(74) *Attorney, Agent, or Firm* — JCIPRNET

(57) ABSTRACT

An imaging device derives a change amount of image magnification corresponding to each of a plurality of F-numbers in an autofocus area on the basis of a reference value of the change amount of the image magnification in accordance with a change in position of a focus lens for each of the plurality of F-numbers, in a case where autofocus is executed; determines, as a limit F-number, an F-number corresponding to any change amount equal to or less than a threshold value of the allowed change amount of the image magnification among the derived change amounts; and sets an F-number as the limit F-number in a case where the
(Continued)

F-number obtained from a subject luminance in a case where autofocus is executed exceeds the determined limit F-number.

11 Claims, 14 Drawing Sheets

(51) Int. Cl.
  *G03B 5/00* (2021.01)
  *G03B 13/36* (2021.01)
  *H04N 5/225* (2006.01)
  *H04N 5/235* (2006.01)

(52) U.S. Cl.
  CPC ......... *H04N 5/2253* (2013.01); *H04N 5/2254* (2013.01); *H04N 5/2351* (2013.01); *H04N 5/2353* (2013.01); *G03B 2205/0046* (2013.01)

(58) Field of Classification Search
  CPC ............ G03B 2205/0046; G03B 17/54; G03B 2215/0567; G03B 30/00; G03B 35/08; H04N 5/2253; H04N 5/2254; H04N 5/2351; H04N 5/2353; H04N 5/238; H04N 5/232123; H04N 5/232127; H04N 5/23209
  See application file for complete search history.

(56) References Cited

U.S. PATENT DOCUMENTS

| | | | |
|---|---|---|---|
| 8,717,490 B2 | 5/2014 | Imamura | |
| 8,761,592 B2 | 6/2014 | Ohara et al. | |
| 8,860,874 B2 | 10/2014 | Nishiguchi et al. | |
| 8,947,579 B2* | 2/2015 | Terashima | ......... H04N 5/23293 348/345 |
| 8,989,568 B2 | 3/2015 | Ohara et al. | |
| 9,210,314 B2 | 12/2015 | Yasuda et al. | |
| 10,095,003 B2 | 10/2018 | Usami | |
| 2006/0268147 A1 | 11/2006 | Ito | |
| 2019/0141251 A1* | 5/2019 | Ardo | .................. H04N 5/23216 |

FOREIGN PATENT DOCUMENTS

| | | |
|---|---|---|
| CN | 102572275 | 7/2012 |
| CN | 103209297 | 7/2013 |
| CN | 103424850 | 12/2013 |
| JP | H02118538 | 5/1990 |
| JP | H02126245 | 5/1990 |
| JP | 2011215249 | 10/2011 |
| JP | 2014045913 | 3/2014 |
| JP | 2014123050 | 7/2014 |
| JP | 2016071010 | 5/2016 |
| JP | 2016090627 | 5/2016 |

OTHER PUBLICATIONS

"Written Opinion of the International Searching Authority (Form PCT/ISA/237) of PCT/JP2018/036922," dated Jan. 8, 2019, with English translation thereof, pp. 1-7.

"Office Action of China Counterpart Application", dated Sep. 22, 2021, with English translation thereof, p. 1-p. 18.

* cited by examiner

| STOP POSITION | F-NUMBER | CHANGE AMOUNT (%) |
|---|---|---|
| 0 | 2.0 | 0.020 |
| 1 | 2.2 | 0.022 |
| 2 | 2.5 | 0.024 |
| ... | ... | ... |
| 13 | 9.0 | 0.088 |
| 14 | 10 | 0.098 |
| 15 | 11 | 0.110 |
| 16 | 13 | 0.124 |
| ... | ... | ... |
| 19 | 18 | 0.176 |
| 20 | 20 | 0.198 |
| 21 | 22 | 0.222 |

FIG. 11

| STOP POSITION | F-NUMBER | CHANGE AMOUNT (%) |
|---|---|---|
| 0 | 2.0 | 0.020 |
| 1 | 2.2 | 0.022 |
| 2 | 2.5 | 0.024 |
| ... | ... | ... |
| 13 | 9.0 | 0.088 |
| 14 | 10 | 0.098 |
| 15 | 11 | 0.110 |
| 16 | 13 | 0.124 |
| ... | ... | ... |
| 19 | 18 | 0.176 |
| 20 | 20 | 0.198 |
| 21 | 22 | 0.222 |

35 TIMES ⇧

| CHANGE AMOUNT (%) |
|---|
| 0.70 |
| 0.77 |
| 0.84 |
| ... |
| 3.08 |
| 3.43 |
| 3.85 |
| 4.34 |
| ... |
| 6.16 |
| 6.93 |
| 7.77 |

0.5 TIMES ⇧

| CHANGE AMOUNT (%) |
|---|
| 0.350 |
| 0.385 |
| 0.420 |
| ... |
| 1.540 |
| 1.715 |
| 1.925 |
| 2.170 |
| ... |
| 3.080 |
| 3.465 |
| 3.885 |

| F2.8 | F2.8 | F2.8 | F4   | F5.6 | F8   | F8   | F8   | F5.6 | F4   | F2.8 | F2.8 |
| F2.8 | F2.8 | F4   | F5.6 | F8   | F11  | F11  | F11  | F8   | F5.6 | F4   | F2.8 |
| F2.8 | F4   | F5.6 | F8   | F11  | F16  | F16  | F16  | F11  | F8   | F5.6 | F4   |
| F4   | F5.6 | F8   | F11  | F16  | F20  | F20  | F20  | F16  | F11  | F8   | F5.6 |
| F4   | F5.6 | F8   | F11  | F16  | F20  | F20  | F20  | F16  | F11  | F8   | F5.6 |
| F4   | F5.6 | F8   | F11  | F16  | F20  | F20  | F20  | F16  | F11  | F8   | F5.6 |
| F2.8 | F4   | F5.6 | F8   | F11  | F16  | F16  | F16  | F11  | F8   | F5.6 | F4   |
| F2.8 | F2.8 | F4   | F5.6 | F8   | F11  | F11  | F11  | F8   | F5.6 | F4   | F2.8 |
| F2.8 | F2.8 | F2.8 | F4   | F5.6 | F8   | F8   | F8   | F5.6 | F4   | F2.8 | F2.8 |

IMAGING DEVICE, IMAGING METHOD, AND PROGRAM CAPABLE OF SUPPRESSING DECREASE IN AUTOFOCUSING ACCURACY

CROSS-REFERENCE TO RELATED APPLICATIONS

This application is a continuation application of International Application No. PCT/JP2018/036922, filed Oct. 2, 2018, the disclosure of which is incorporated herein by reference in its entirety. Further, this application claims priority from Japanese Patent Application No. 2018-010738 filed on Jan. 25, 2018, the disclosures of which are incorporated herein by reference in its entirety.

BACKGROUND

1. Technical Field

The present disclosure relates to an imaging device, an imaging method, and a program.

2. Description of the Related Art

In the related art, an imaging device which changes the F-number to a certain reference F-number or smaller in accordance with a position or an image magnification of a focus lens for obtaining proper blurriness at an out-of-focus position is disclosed (refer to JP RE2014-045913A).

Further, an imaging device which calculates an image magnification of a subject, further calculates the F-number from the calculated image magnification, and uses the F-number calculated from the image magnification of the subject as a control F-number for exposure in a case where the image magnification exceeds a certain value is disclosed (refer to JP1990-126245A (JP-H2-126245A)).

SUMMARY

In lenses of an imaging device, there is a lens in which the image magnification of a subject changes in accordance with a change in position of the focus lens (so-called breathing occurs). In an imaging device comprising such a lens, in a case where autofocus is executed by a method of using an evaluation value in an autofocus area (for example, a contrast autofocus (AF) method) without considering a change amount of the image magnification, a subject may be out of the autofocus area, in some cases. In this case, the evaluation value in the autofocus area is not a correct value, and as a result, the focusing accuracy is decreased.

However, in the technology disclosed in JP RE2014-045913A and JP1990-126245A (JP-H2-126245A), although the image magnification is considered, a change amount of the image magnification has not been considered.

The present disclosure is made in view of the above-described circumstances, and provides an imaging device, an imaging method, and a program which can suppress a decrease in focusing accuracy due to an imaging device in which a lens of which an image magnification changes in accordance with a change in position of a focus lens is mounted.

An imaging device according to an aspect of the present disclosure comprises an imaging lens including a focus lens; an imaging unit that captures an optical image having passed through the imaging lens; an acquisition unit that acquires a reference value of a change amount of image magnification in accordance with a change in position of the focus lens for each of a plurality of F-numbers; a derivation unit that derives a change amount of image magnification corresponding to each of the plurality of F-numbers in an autofocus area on the basis of the reference value of the change amount acquired by the acquisition unit, in a case where autofocus is executed; a determination unit that determines, as a limit F-number, an F-number corresponding to any change amount equal to or less than a threshold value of the allowed change amount of the image magnification among the change amounts derived by the derivation unit; and a setting unit that sets an F-number as the limit F-number in a case where the F-number obtained from a subject luminance in a case where autofocus is executed exceeds the limit F-number determined by the determination unit.

In the imaging device of the aspect of the present disclosure, the threshold value may be greater as a size of the autofocus area is greater.

The imaging device of the aspect of the present disclosure may further comprise a detection unit that detects a movement amount of a subject before execution of autofocus, in which the threshold value may be smaller as the movement amount of the subject detected by the detection unit is greater.

In the imaging device of the aspect of the present disclosure, the threshold value may be greater as a frame rate in a case of searching a focusing position by autofocus is greater.

In the imaging device of the aspect of the present disclosure, in a case where an operation mode of autofocus is a mode in which focusing accuracy is prioritized, the threshold value may be greater as the frame rate is greater.

In the imaging device of the aspect of the present disclosure, the threshold value may be smaller as a subject distance in a case of previously executing autofocus is shorter.

In the imaging device of the aspect of the present disclosure, in a case where the threshold value is smaller as the subject distance is shorter within a range between a lower limit and an upper limit of the subject distance, the lower limit and the upper limit may be greater as a focal length of the imaging lens is longer.

In the imaging device of the aspect of the present disclosure, in a case where a similarity between an execution result of auto exposure in a case of previously executing autofocus and an execution result of current auto exposure is equal to or greater than a predetermined degree, the threshold value may be smaller as the subject distance is shorter.

In the imaging device of the aspect of the present disclosure, the determination unit may determine, as the limit F-number, an F-number which is equal to or less than the threshold value and corresponds to a maximum change amount, among the change amounts derived by the derivation unit.

An imaging method according to another aspect of the present disclosure is an imaging method executed by an imaging device provided with an imaging lens including a focus lens, and an imaging unit that captures an optical image having passed through the imaging lens, and the imaging method comprises acquiring a reference value of a change amount of image magnification in accordance with a change in position of the focus lens for each of a plurality of F-numbers; deriving a change amount of image magnification corresponding to each of the plurality of F-numbers in an autofocus area on the basis of the acquired reference value of the change amount, in a case where autofocus is executed; determining, as a limit F-number, an F-number corresponding to any change amount equal to or less than a threshold value of the allowed change amount of the image magnification among the derived change amounts; and setting an F-number as the limit F-number in a case where the F-number obtained from a subject luminance in a case where autofocus is executed exceeds the determined limit F-number.

A program according to another aspect of the present disclosure causes a computer that controls an imaging device provided with an imaging lens including a focus lens, and an imaging unit that captures an optical image having passed through the imaging lens, to execute a process comprising acquiring a reference value of a change amount of image magnification in accordance with a change in position of the focus lens for each of a plurality of F-numbers; deriving a change amount of image magnification corresponding to each of the plurality of F-numbers in an autofocus area on the basis of the acquired reference value of the change amount, in a case where autofocus is executed; determining, as a limit F-number, an F-number corresponding to any change amount equal to or less than a threshold value of the allowed change amount of the image magnification among the derived change amounts; and setting an F-number as the limit F-number in a case where the F-number obtained from a subject luminance in a case where autofocus is executed exceeds the determined limit F-number.

Further, an imaging device according to another aspect of the present disclosure comprises an imaging lens including a focus lens, an imaging unit that captures an optical image having passed through the imaging lens, a memory that stores an instruction for a computer to execute, and a processor configured to execute the stored instruction, and the processor acquires a reference value of a change amount of image magnification in accordance with a change in position of the focus lens for each of a plurality of F-numbers; derives a change amount of image magnification corresponding to each of the plurality of F-numbers in an autofocus area on the basis of the acquired reference value of the change amount, in a case where autofocus is executed; determines, as a limit F-number, an F-number corresponding to any change amount equal to or less than a threshold value of the allowed change amount of the image magnification among the derived change amounts; and sets an F-number as the limit F-number in a case where the F-number obtained from a subject luminance in a case where autofocus is executed exceeds the determined limit F-number.

According to the present disclosure, it is possible to suppress a decrease in focusing accuracy due to an imaging device in which a lens of which an image magnification changes in accordance with a change in position of a focus lens is mounted.

BRIEF DESCRIPTION OF THE DRAWINGS

Exemplary embodiments according to the technique of the present disclosure will be described in detail based on the following figures, wherein:

FIG. 11 is a diagram for describing processing of deriving a change amount of image magnification according to each embodiment;

DETAILED DESCRIPTION

Hereinafter, embodiments for implementing the technique of the present disclosure will be described in detail with reference to the drawings.

First Embodiment

Figure 1:
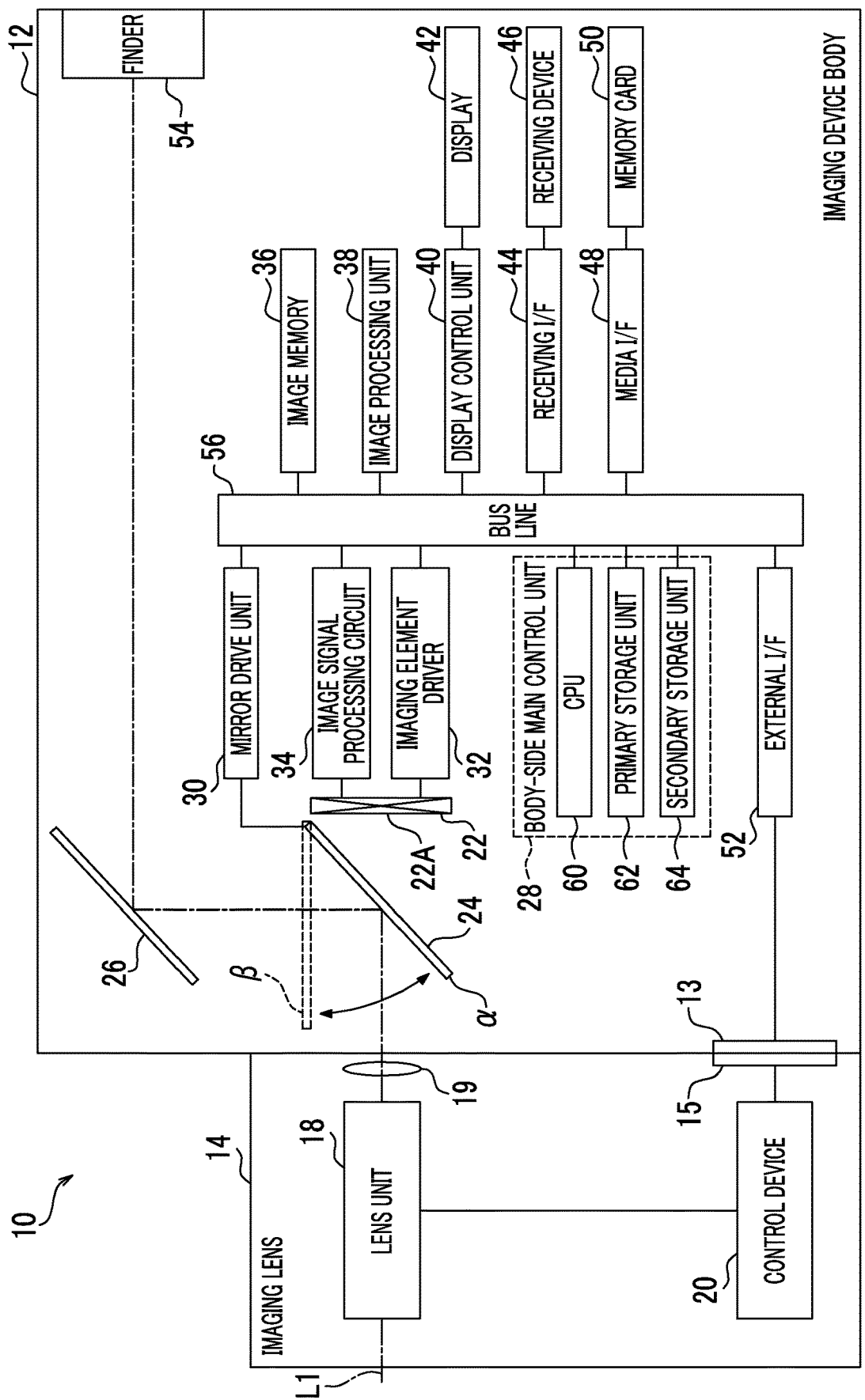
FIG. 1 is a block diagram illustrating an example of a hardware configuration of an imaging device according to each embodiment.

First, a configuration of an imaging device 10 according to the embodiment will be described with reference to FIGS. 1 and 2. As illustrated in FIG. 1, the imaging device 10 is a lens-interchangeable digital camera, and includes an imaging device body 12 and an imaging lens 14. The imaging lens 14 is mounted on the imaging device body 12 to be interchangeable.

The imaging device 10 according to the embodiment has a static image capturing mode and a video capturing mode as operation modes of an imaging system. The static image capturing mode is an operation mode of recording a static image obtained by imaging a subject, and the video capturing mode is an operation mode of recording a video obtained by imaging a subject.

The static image capturing mode and the video capturing mode are selectively set in the imaging device 10 according to an instruction that is given to the imaging device 10 from a user. Further, in the static image capturing mode, a manual focus mode and an autofocus mode are selectively set according to an instruction that is given to the imaging device 10 from a user.

In the autofocus mode, a release button (not illustrated) provided on the imaging device body 12 is made to be in a half-pressed state to adjust imaging conditions and is then made to be in a fully-pressed state to perform main exposure. That is, after an auto exposure (AE) function works to set an exposure state by making the release button to be in the half-pressed state, an AF function works to perform focusing control, and imaging is performed in a case where the release button is made to be in the fully-pressed state.

The imaging device body 12 comprises a mount 13, and the imaging lens 14 comprises a mount 15. The mount 15 is joined to the mount 13 so that the imaging lens 14 is mounted on the imaging device body 12 to be interchangeable. The imaging lens 14 includes a lens unit 18, a stop 19, and a control device 20. The stop 19 is provided closer to the imaging device body 12 than the lens unit 18, and the stop 19 adjusts an amount of subject light transmitted through the lens unit 18 and guides the subject light into the imaging device body 12. The control device 20 is electrically connected to the imaging device body 12 through the mounts 13 and 15, and controls the entire imaging lens 14 according to an instruction from the imaging device body 12.

The imaging device body 12 includes an imaging sensor 22, a first mirror 24, a second mirror 26, a body-side main control unit 28, a mirror drive unit 30, an imaging sensor driver 32, an image signal processing circuit 34, an image memory 36, an image processing unit 38, a display control unit 40, and a display 42. In addition, the imaging device body 12 further includes a receiving interface (I/F) 44, a receiving device 46, a media I/F 48, a memory card 50, an external I/F 52, and a finder 54. The imaging sensor 22 is an example of an imaging unit that captures an optical image having passed through the imaging lens 14.

The body-side main control unit 28 is an example of a computer that controls the imaging device 10, and comprises a central processing unit (CPU) 60, a primary storage unit 62, and a secondary storage unit 64. The CPU 60 controls the entire imaging device 10. The primary storage unit 62 is a volatile memory that is used as a work area and the like in a case of execution of various programs. Examples of the primary storage unit 62 include a random access memory (RAM). The secondary storage unit 64 is a non-volatile memory that stores various programs, various parameters, and the like in advance. Examples of the secondary storage unit 64 include a flash memory.

The CPU 60, the primary storage unit 62, and the secondary storage unit 64 are connected to a bus line 56. In addition, the mirror drive unit 30, the imaging sensor driver 32, the image signal processing circuit 34, the image memory 36, the image processing unit 38, the display control unit 40, the receiving I/F 44, the media I/F 48, and the external I/F 52 are also connected to the bus line 56.

The first mirror 24 is a movable mirror that is interposed between a light-receiving surface 22A of the imaging sensor 22 and the lens unit 18 and is movable between a light-receiving surface covering position α and a light-receiving surface opening position β. The first mirror 24 is connected to the mirror drive unit 30, and the mirror drive unit 30 drives the first mirror 24 under the control of the CPU 60 to selectively dispose the first mirror 24 at the light-receiving surface covering position α and the light-receiving surface opening position β. That is, the first mirror 24 is disposed at the light-receiving surface covering position α by the mirror drive unit 30 in a case where subject light is not to be received by the light-receiving surface 22A, and the first mirror 24 is disposed at the light-receiving surface opening position β by the mirror drive unit 30 in a case where subject light is to be received by the light-receiving surface 22A.

At the light-receiving surface covering position α, the first mirror 24 covers the light-receiving surface 22A and reflects the subject light, which is guided from the lens unit 18, to guide the subject light to the second mirror 26. The second mirror 26 reflects the subject light, which is guided from the first mirror 24, to guide the subject light to the finder 54 through the optical system (not illustrated). The finder 54 transmits the subject light that is guided by the second mirror 26. At the light-receiving surface opening position β, a state where the light-receiving surface 22A is covered with the first mirror 24 is released, and subject light is received by the light-receiving surface 22A without being reflected by the first mirror 24.

The imaging sensor driver 32 is connected to the imaging sensor 22, and supplies driving pulses to the imaging sensor 22 under the control of the CPU 60. Respective pixels of the imaging sensor 22 are driven according to the driving pulses that are supplied by the imaging sensor driver 32. In the embodiment, a charge coupled device (CCD) image sensor is used as the imaging sensor 22, but the technique of the present disclosure is not limited thereto and other image sensors such as a complementary metal oxide semiconductor (CMOS) image sensor may be used.

The image signal processing circuit 34 reads, for each pixel, image signals corresponding to one frame from the imaging sensor 22 under the control of the CPU 60. The image signal processing circuit 34 performs various kinds of processing, such as correlative double sampling processing, automatic gain control, and A/D conversion, on the read image signals. The image signal processing circuit 34 outputs digitized image signals, which are obtained by performing various kinds of processing on the image signals, to the image memory 36 for each frame at a predetermined frame rate (for example, several tens of frames/second) that is defined by a clock signal supplied from the CPU 60. The image memory 36 temporarily holds the image signals that are input from the image signal processing circuit 34.

The image processing unit 38 acquires image signals from the image memory 36 for each frame at a predetermined frame rate, and performs various kinds of processing, such as gamma correction, luminance/color difference conversion, and compression processing, on the acquired image signals. In addition, the image processing unit 38 outputs the image signals, which are obtained through the various kinds of processing, to the display control unit 40 for each frame at a predetermined frame rate. Further, the image processing unit 38 outputs the image signals, which are obtained through the various kinds of processing, to the CPU 60 in response to the request of the CPU 60.

The display control unit 40 is connected to the display 42, and controls the display 42 under the control of the CPU 60. Further, the display control unit 40 outputs the image signals, which are input from the image processing unit 38, to the display 42 for each frame at a predetermined frame rate. The display 42 displays an image represented by the image signals which are input at a predetermined frame rate from the display control unit 40, as a live view image. Further, the display 42 also displays a static image that is a single frame image obtained through imaging with a single frame. A menu screen and the like are also displayed on the display 42 in addition to the live view image.

The receiving device 46 has a dial, the release button, a cross key, a MENU key, a touch panel, and the like which are not illustrated, and receives various instructions from a user. The receiving device 46 is connected to the receiving I/F 44, and outputs an instruction content signal indicating the contents of the received instruction, to the receiving I/F 44. The receiving I/F 44 outputs the instruction content signal, which is input from the receiving device 46, to the CPU 60. The CPU 60 executes processing corresponding to the instruction content signal input from the receiving I/F 44.

The media I/F 48 is connected to the memory card 50, and performs recording and reading of an image file with respect to the memory card 50 under the control of the CPU 60. Under the control of the CPU 60, the image file that is read from the memory card 50 by the media I/F 48 is subjected to decompression processing by the image processing unit 38 to be displayed on the display 42 as a playback image.

The mount 15 is connected to the mount 13 so that the external I/F 52 is connected to the control device 20 of the imaging lens 14, and the external I/F 52 takes charge of transmission and reception of various kinds of information between the CPU 60 and the control device 20.

Figure 2:
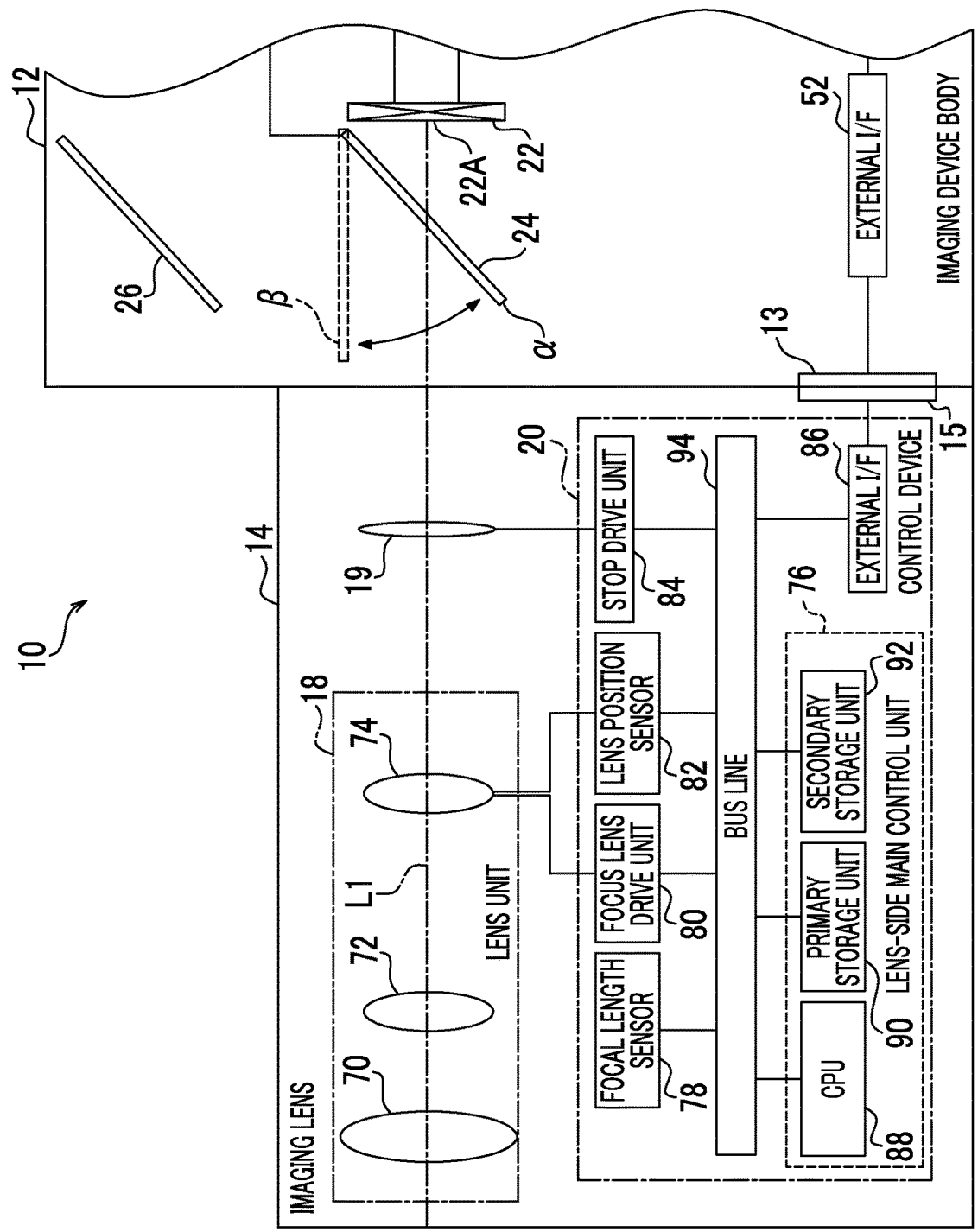
FIG. 2 is a block diagram illustrating an example of a hardware configuration of an imaging lens included in the imaging device according to each embodiment.

As illustrated in FIG. 2, for example, the lens unit 18 according to the embodiment includes an incident lens 70, a zoom lens 72, and a focus lens 74. The incident lens 70, the zoom lens 72, and the focus lens 74 are arranged along an optical axis L1; and the focus lens 74, the zoom lens 72, and the incident lens 70 are arranged along the optical axis L1 in this order from the stop 19 side.

Subject light is incident on the incident lens 70. The incident lens 70 transmits the subject light and guides the subject light to the zoom lens 72. The zoom lens 72 according to the embodiment includes a plurality of lenses that are movable along the optical axis L1, and the focal length of the imaging lens 14 (hereinafter, simply referred to as a "focal length") is adjusted by adjusting the state of the zoom lens 72. Specifically, in the zoom lens 72, a zoom ring (not illustrated) provided in the imaging lens 14 is rotated to cause respective lenses to be close to each other or to be far from each other along the optical axis L1 so that the positional relationship of the lenses along the optical axis L1 is adjusted, and thereby the focal length is adjusted. The zoom lens 72 transmits the subject light, which is incident from the incident lens 70, and guides the subject light to the focus lens 74.

The focus lens 74 is a lens movable along the optical axis L1, and is moved along the optical axis L1 to change the focus state of a subject image that is formed on the light-receiving surface 22A of the imaging sensor 22. The focus lens 74 transmits the subject light, which is incident from the zoom lens 72, and guides the subject light to the stop 19. The stop 19 adjusts the amount of the subject light that is incident from the focus lens 74, transmits the subject light, and guides the subject light to the imaging device body 12.

The imaging lens 14 according to the embodiment is a lens of which an image magnification changes in accordance with a change in position of the focus lens 74 along the optical axis L1. Here, the image magnification means a ratio of a height of an image of a subject captured by the imaging sensor 22 to an actual height of the subject. Hereinafter, in case of simply describing the position of the focus lens 74, it represents the position of the focus lens 74 along the optical axis L1.

The control device 20 of the imaging lens 14 includes a lens-side main control unit 76, a focal length sensor 78, a focus lens drive unit 80, a lens position sensor 82, a stop drive unit 84, and an external I/F 86.

The lens-side main control unit 76 comprises a CPU 88, a primary storage unit 90, and a secondary storage unit 92. The CPU 88 controls the entire imaging lens 14. The primary storage unit 90 is a volatile memory that is used as a work area and the like in a case of execution of various programs. Examples of the primary storage unit 90 include a RAM. The secondary storage unit 92 is a non-volatile memory that stores various programs, various parameters, and the like in advance. Examples of the secondary storage unit 92 include a flash memory.

The CPU 88, the primary storage unit 90, and the secondary storage unit 92 are connected to a bus line 94. Further, the focal length sensor 78, the focus lens drive unit 80, the lens position sensor 82, the stop drive unit 84, and the external I/F 86 are also connected to the bus line 94.

The mount 15 is connected to the mount 13 so that the external I/F 86 is connected to the external I/F 52 of the imaging device body 12, and the external I/F 86 takes charge of transmission and reception of various kinds of information between the CPU 88 and the CPU 60 of the imaging device body 12 in cooperation with the external I/F 52.

The focal length sensor 78 detects the state of the zoom lens 72 from the rotation state of the zoom ring, and converts the detected state of the zoom lens 72 into the focal length. Then, the focal length sensor 78 outputs focal length information indicating the focal length obtained by the conversion, to the CPU 88.

The focus lens drive unit 80 includes a focus lens-driving motor (not illustrated). The focus lens drive unit 80 moves the focus lens 74 along the optical axis L1 by operating the focus lens-driving motor under the control of the CPU 88 according to an instruction that is received by the receiving device 46. That is, the focus lens drive unit 80 moves the focus lens 74 along the optical axis L1 by operating the focus lens-driving motor according to an instruction from the CPU 88 and transmitting the power of the focus lens-driving motor to the focus lens 74. The lens position sensor 82 includes, for example, an encoder, and the lens position sensor 82 detects the position of the focus lens 74, and outputs lens position information indicating the detected position, to the CPU 88.

The stop drive unit 84 includes a stop-driving motor (not illustrated). The stop drive unit 84 adjusts the size of the aperture of the stop 19 by operating the stop-driving motor under the control of the CPU 88 according to an instruction that is received by the receiving device 46.

Figure 3:
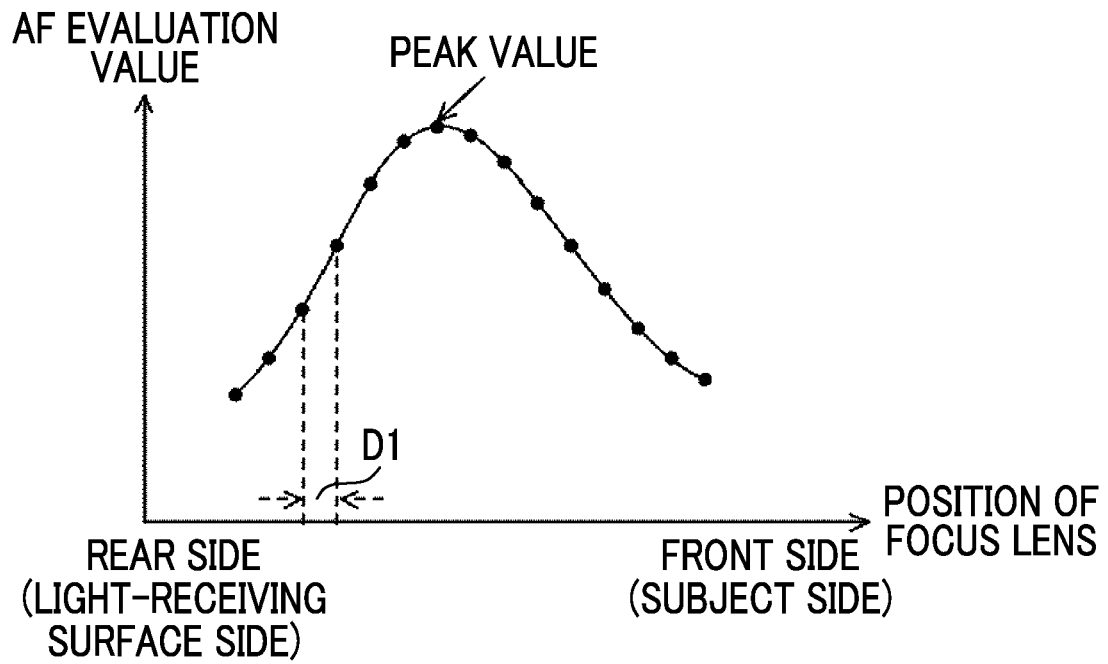
FIG. 3 is a graph for describing autofocus according to each embodiment.
Figure 4:
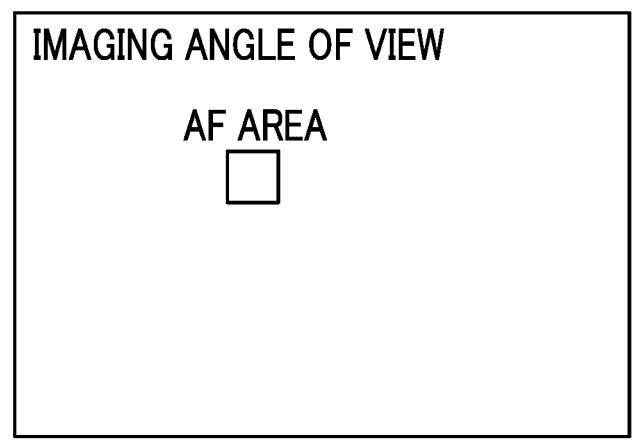
FIG. 4 is a diagram for describing an autofocus area according to each embodiment.

The imaging device 10 according to the embodiment performs autofocus using a so-called contrast AF method. Specifically, the imaging device 10 according to the embodiment derives an evaluation value for autofocus (hereinafter, referred to as "AF evaluation value") in an area within an imaging angle of view while moving the focus lens 74 from the rear side (light-receiving surface side) to the front side (subject side) along the optical axis L1 as illustrated in FIG. 3, for example. Hereinafter, for example, as illustrated in FIG. 4, an area within an imaging angle of view used for deriving the AF evaluation value is referred to as an "autofocus area (AF area)". The position of the AF area within the imaging angle of view is determined by being designated with respect to the live view image (so-called through image) displayed on the display 42 by a user or by tracking the subject within the imaging angle of view. In the embodiment, for the size (length and width) of the AF area, a default value is set.

Then, the imaging device 10 performs focusing control by moving the focus lens 74 to a position where the derived AF evaluation value is the peak value. In the embodiment, as the AF evaluation value, a contrast value of an AF area is applied. Hereinafter, a distance (D1 illustrated in FIG. 3) between consecutive positions in a case of deriving the AF evaluation value while changing the position of the focus lens 74 is referred to as a "distance D1". The distance D1 may be the same or different between consecutive positions.

Figures 5, 6:
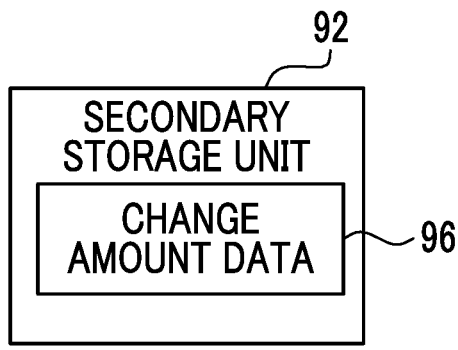
FIG. 5 is a conceptual diagram illustrating an example of contents stored in a secondary storage unit of a lens-side main control unit included in the imaging lens according to each embodiment.
FIG. 6 is a diagram illustrating an example of change amount data according to each embodiment.

As illustrated in FIG. 5, for example, the secondary storage unit 92 of the lens-side main control unit 76 stores change amount data 96. The change amount data 96 includes reference values of change amounts of the image magnification in accordance with the change in position of the focus lens 74.

As illustrated in FIG. 6, for example, the change amount data 96 includes a plurality of sets of stop position, F-number, and change amounts of image magnification. The stop position represents the stop position of the stop 19. The F-number represents the F-number in a case where the stop 19 is positioned at the corresponding stop position. The change amount of the image magnification represents a percentage that the image magnification changes at a position where an image height is 80% in a case where the position of the focus lens 74 is changed by a distance equivalent to one time the focal depth, in a case where the corresponding F-number is set. Here, the image height represents a ratio of a distance from the optical axis L1 to a target position within the imaging angle of view, to a distance from the optical axis L1 (that is, center of the imaging angle of view) to any of the four corners of the imaging angle of view. For example, in the example illustrated in FIG. 6, in a case where the F-number is set to "F2.0", in a case where the position of the focus lens 74 is changed by a distance equivalent to one time the focal depth, the image magnification at a position where the image height is 80% changes by 0.02%.

In other words, the change amount data 96 according to the embodiment includes a reference value of the change amount of the image magnification in accordance with the change in position of the focus lens 74, for each of a plurality of F-numbers. In the embodiment, the plurality of F-numbers included in the change amount data 96 are F-numbers that can be set in the imaging lens 14.

The change amount of the image magnification of the change amount data 96 is not limited to the percentage that the image magnification changes in a case where the position of the focus lens 74 is changed by a distance equivalent to one time the focal depth. The change amount of the image magnification of the change amount data 96 may be a percentage that the image magnification changes in a case where the position of the focus lens 74 is changed by a distance equivalent to a multiple of the focal depth. Further, the change amount of the image magnification of the change amount data 96 is not limited to the percentage that the image magnification changes at the position where the image height is 80%, and for example, may be a percentage that the image magnification changes at a position other than the position where the image height is 80%, such as a position where the image height is 50%.

Figure 7:
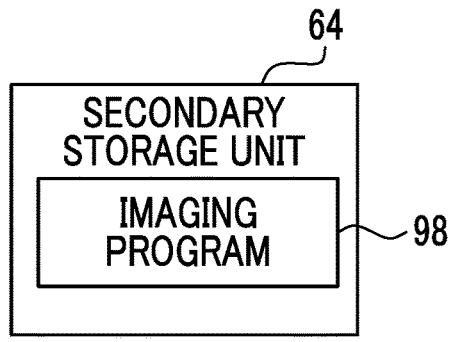
FIG. 7 is a conceptual diagram illustrating an example of contents stored in a secondary storage unit of a body-side main control unit included in an imaging device body according to each embodiment.

On the other hand, as illustrated in FIG. 7, for example, the secondary storage unit 64 of the body-side main control unit 28 stores an imaging program 98. The CPU 60 reads the imaging program 98 from the secondary storage unit 64, develops the imaging program 98 in the primary storage unit 62, and executes AF control processing (refer to FIG. 8), which will be described below, according to the developed imaging program 98. In other words, the CPU 60 operates as an acquisition unit, a derivation unit, a determination unit, and a setting unit by executing the imaging program 98.

Next, the operation of the imaging device 10 according to the embodiment will be described with reference to FIG. 8. The AF control processing illustrated in FIG. 8 is executed in a case where an instruction to execute autofocus is input by a user making the release button provided on the imaging device body 12 to be in the half-pressed state, for example.

Figure 8:
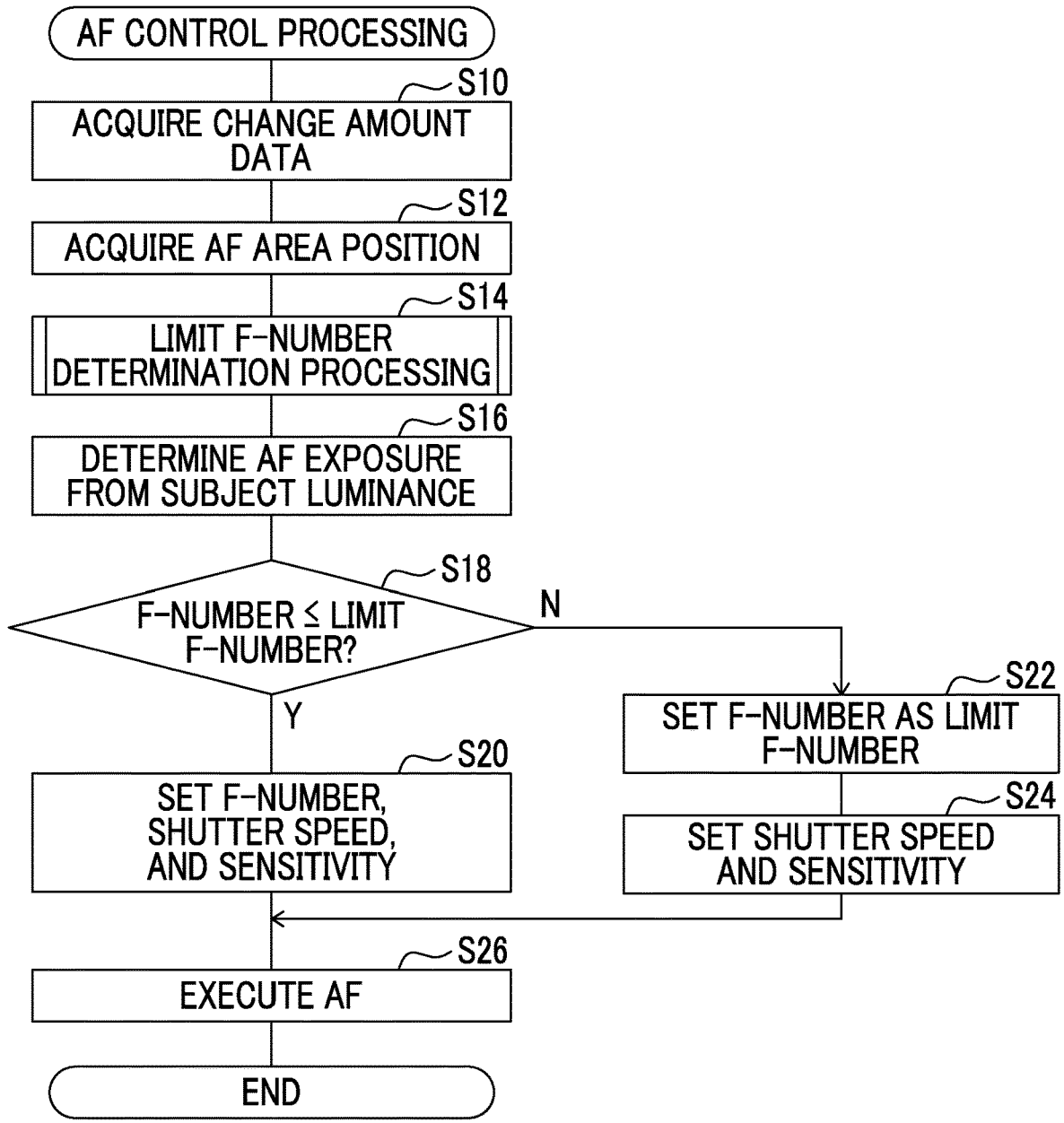
FIG. 8 is a flowchart illustrating an example of AF control processing according to each embodiment.

In step S10 of FIG. 8, the CPU 60 acquires a reference value of the change amount of the image magnification in accordance with the change in position of the focus lens 74, for each of a plurality of F-numbers. Specifically, the CPU 60 outputs an instruction to acquire the change amount data 96, to the CPU 88 through the external I/F 52. In a case where the instruction to acquire the change amount data 96 is input from the CPU 60, the CPU 88 outputs the change amount data 96 stored in the secondary storage unit 92, to the CPU 60 through the external I/F 86. The CPU 60 acquires the change amount data 96 input from the CPU 88, through the external I/F 52.

Figure 9:
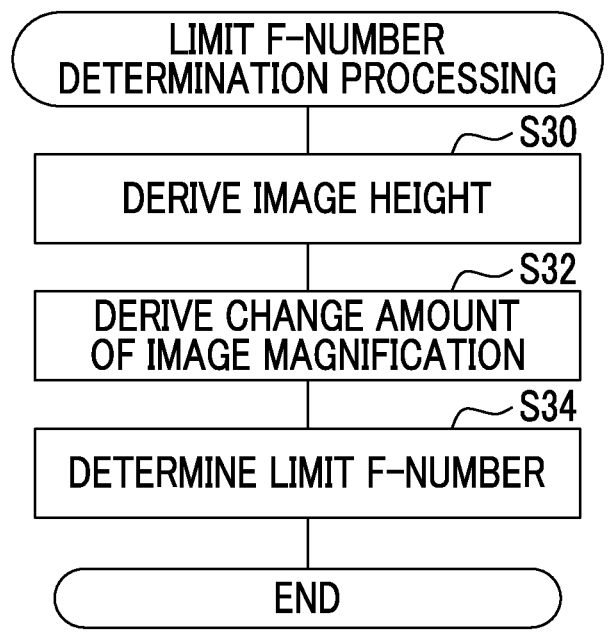
FIG. 9 is a flowchart illustrating an example of limit F-number determination processing according to a first embodiment.
Figure 10:
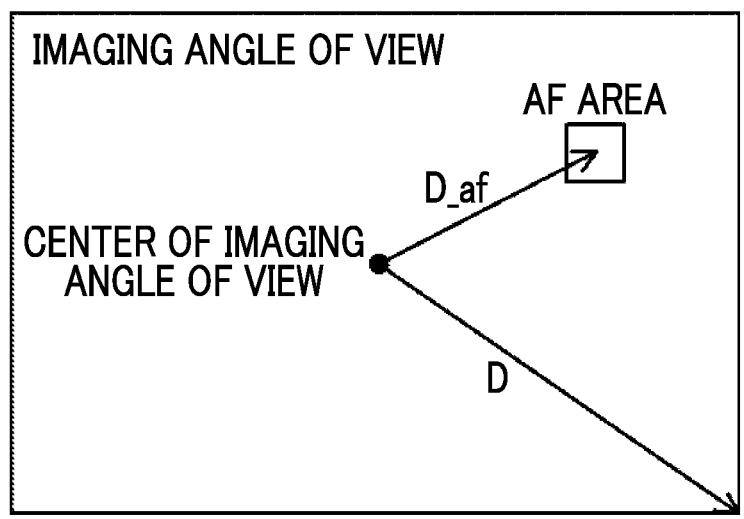
FIG. 10 is a diagram for describing processing of deriving image height according to each embodiment.

In step S12, the CPU 60 acquires the position of the AF area (in the embodiment, the position of the center of the AF area) in the imaging angle of view. In step S14, the limit F-number determination processing illustrated in FIG. 9 is executed. In step S30 of FIG. 9, the CPU 60 derives the image height at the position of the AF area acquired by the processing in step S12. Specifically, for example, as illustrated in FIG. 10, the CPU 60 derives the image height at the position of the AF area by dividing a distance (D_af illustrated in FIG. 10) from the center of the imaging angle of view to the position of the center of the AF area by a distance (D illustrated in FIG. 10) from the center of the imaging angle of view to any of the four corners (lower right corner in the example of FIG. 10) of the imaging angle of view.

In step S32, the CPU 60 derives a change amount of image magnification corresponding to each of the plurality of F-numbers in the position of the AF area acquired by the processing in step S12, on the basis of the change amount data 96 acquired by the processing in step S10. In the AF according to the embodiment, the position of the focus lens 74 is changed by a distance (above-described distance D1) equivalent to about seven times the focal depth as one step, and the focusing position is derived using the AF evaluation values for five steps including the position where the AF evaluation value is the peak value. That is, in the embodiment, the AF is based on 35 (7×5) times the focal depth required for deriving the focusing position. In the embodiment, the CPU 60 derives the change amount of the image magnification equivalent to 35 times the focal depth by multiplying the change amount of the image magnification of the change amount data 96 by 35 times as illustrated in the middle of FIG. 11, for example.

In a case where the processing of deriving the change amount of the image magnification is represented by a general expression, following Expression (1) is obtained.

$$\text{Change amount of image magnification} = \text{reference value of change amount of image magnification in change amount data} 96 \times KD \times ST \div SS \quad (1)$$

In Expression (1), KD represents that the position of the focus lens 74 is changed by a distance equivalent to about KD times the focal depth as one step during AF. Further, in Expression (1), ST represents that the focusing position is derived using the AF evaluation values for ST steps including the position where the AF evaluation value is the peak value during AF. In Expression (1), SS represents that the reference value of the change amount of the image magnification of the change amount data 96 is the change amount of the image magnification in a case where the position of the focus lens 74 is changed by a distance equivalent to SS times the focal depth.

Next, the CPU 60 derives a coefficient K according to following Expression (2) using an image height ZP corresponding to the change amount of the image magnification in the change amount data 96 and the image height (D_af÷D) derived by the processing of step S30.

$$K=(D\_af÷D)÷ZP \qquad (2)$$

Then, the CPU 60 derives the change amount of the image magnification corresponding to each of the plurality of F-numbers at the position of the AF area acquired by the processing of step S12, by multiplying the derived coefficient K and the derived change amount of the image magnification equivalent to 35 times the focal depth. For example, in a case where the image height of the position of the AF area acquired by the processing of step S12 is 40%, the CPU 60 derives a value obtained by multiplying 0.5 (=40%÷80%) to the derived change amount of the image magnification equivalent to 35 times the focal depth, for example, as illustrated in the right side of FIG. 11.

Figures 12, 13:
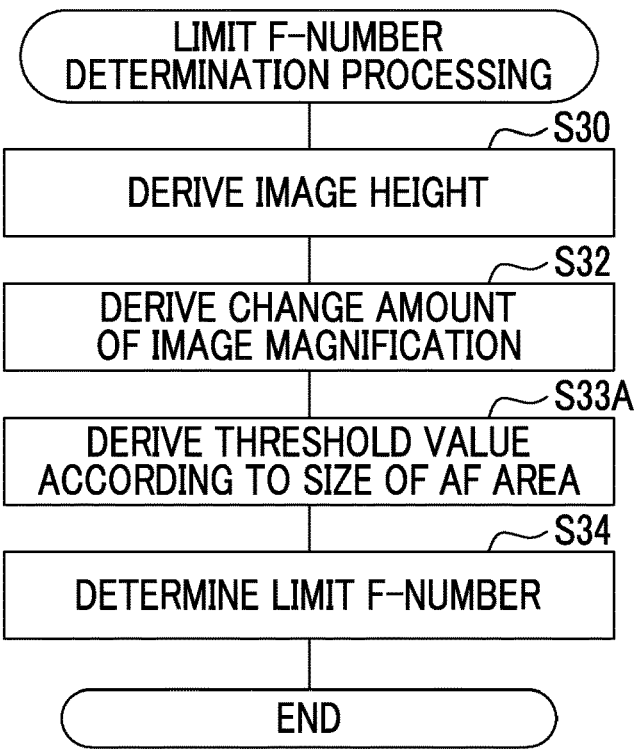
FIG. 12 is a diagram illustrating an example of a limit F-number according to the first embodiment.
FIG. 13 is a flowchart illustrating an example of limit F-number determination processing according to a second embodiment.

In step S34, the CPU 60 determines, as a limit F-number, the F-number which is equal to or less than a threshold value TH1 and corresponds to the maximum change amount, among change amounts of image magnifications corresponding to the plurality of F-numbers at the position of the AF area derived by the processing in step S32. For example, in the example of FIG. 11, in a case where the image height at the position of the AF area is 80% and the threshold value TH1 is 3.5%, the limit F-number is determined to be F10. Further, for example, in the example of FIG. 11, in a case where the image height at the position of the AF area is 40% and the threshold value TH1 is 3.5%, the limit F-number is determined to be F20. Accordingly, in the embodiment, as illustrated in FIG. 12, the limit F-number is determined according to the position of the AF area. Specifically, the limit F-number is determined to be smaller (value on the open side) as the AF area is farther from the center of the imaging angle of view (as the image height is increased).

As the threshold value TH1, for example, an upper limit value of the allowed change amount of the image magnification can be applied. As a specific example, a half value of a ratio of a length of the AF area in a horizontal direction to a length of the imaging angle of view in the horizontal direction is applied as the threshold value TH1. This is because the case where the subject at the center of the AF area gets out of the AF area is a case where the subject is shifted more than half of the AF area in the horizontal direction from the center of the AF area. Further, in this case, instead of the ratio of the length of the AF area in the horizontal direction to the length of the imaging angle of view in the horizontal direction, a ratio of a length of the AF area in a vertical direction to a length of the imaging angle of view in the vertical direction may be used. In this case, instead of the ratio of the length of the AF area in the horizontal direction to the length of the imaging angle of view in the horizontal direction, a ratio of a length of the AF area in a diagonal direction to a length of the imaging angle of view in the diagonal direction may be used.

In step S34, the CPU 60 may determine, as the limit F-number, the F-number corresponding to any change amount within a predetermined range equal to or less than the threshold value TH1 with the threshold value TH1 as the upper limit, among change amounts of image magnifications corresponding to the plurality of F-numbers at the position of the AF area. In a case where the processing of step S34 is ended, the limit F-number determination processing is ended, and the processing proceeds to step S16 of the AF control processing illustrated in FIG. 8.

In step S16 of FIG. 8, the CPU 60 determines an exposure state (F-number, shutter speed, and sensitivity) in the AF from the subject luminance. Specifically, the CPU 60 determines the F-number, the shutter speed, and the sensitivity from the subject luminance by performing an AE control using the AF area.

In step S18, the CPU 60 determines whether the F-number determined by the processing of step S16 is equal to or less than the limit F-number determined by the processing of step S14. In a case where the determination is affirmative, the processing proceeds to step S20. In step S20, the CPU 60 sets the F-number, the shutter speed, and the sensitivity which are determined by the processing of step S16, as the F-number, shutter speed, and the sensitivity in a case of executing the AF. In a case where the processing of step S20 is ended, the processing proceeds to step S26.

On the other hand, in a case where the determination of step S18 is negative, the processing proceeds to step S22. In step S22, the CPU 60 sets the limit F-number determined by the processing of step S14, as the F-number in a case of executing the AF. In step S24, the CPU 60 determines the shutter speed and the sensitivity corresponding to the F-number set by the processing of step S22, by performing the AE control. Then, the CPU 60 sets the determined shutter speed and sensitivity, as the shutter speed and the sensitivity in a case of executing the AF. In a case where the processing of step S24 is ended, the processing proceeds to step S26.

In step S26, the CPU 60 executes the AF according to the F-number, the shutter speed, and the sensitivity which are set through the above-described processing. In a case where the processing of step S26 is ended, the AF control processing is ended.

As described above, according to the embodiment, in case of executing the AF, the change amount of the image magnification corresponding to each of the plurality of F-numbers in the AF area is derived on the basis of the reference value of the change amount of the image magnification in accordance with the change in position of the focus lens 74 for each of the plurality of F-numbers. Further, among the derived change amounts, the F-number corresponding to any change amount equal to or less than the threshold value TH1 of the allowed change amount of the image magnification is determined as the limit F-number. Then, in a case where the F-number in a case of executing the AF, which is obtained from the subject luminance, exceeds the determined limit F-number, the F-number is set as the limit F-number. Accordingly, the subject is prevented from getting out of the AF area, and as a result, it is possible to suppress a decrease in focusing accuracy.

Second Embodiment

A second embodiment of the technique of the present disclosure will be described. The configuration of the imaging device 10 according to the embodiment is the same as that of the first embodiment (refer to FIGS. 1 and 2), and thus the description thereof will be omitted.

Depending on the size of the AF area, the change amount of the image magnification may change depending on the position of the focus lens 74 during the search of focusing position in the AF. In the embodiment, the threshold value TH1 is changed according to the size of the AF area so that the limit F-number is changed.

The operation of the imaging device 10 according to the embodiment will be described with reference to FIG. 13. Since the AF control processing according to the embodiment is the same as the AF control processing according to the first embodiment except for limit F-number determination processing of step S14, the limit F-number determination processing will be described here. In FIG. 13, a step executing the same processing as that in FIG. 9 is denoted by the same step number as that in FIG. 9, and the description thereof will be omitted.

In step S33A of FIG. 13, the CPU 60 derives the threshold value TH1 according to the size of the AF area according to following Expression (3).

$$TH1 = TH\_def \times H \div H\_def \quad (3)$$

In Expression (3), TH_def represents the threshold value (threshold value TH1 in the first embodiment) according to the default size of the AF area. In Expression (3), H represents the size of the AF area (in the embodiment, length in the horizontal direction) in the current AF, and H_def represents the default size of the AF area. Accordingly, in the embodiment, the threshold value TH1 is greater as the size of the AF area is greater. In the processing of step S34, the threshold value TH1 derived in step S33A is used, and the limit F-number is determined.

As described above, according to the embodiment, the threshold value TH1 is greater as the size of the AF area is greater. Accordingly, it is possible to suppress a decrease in focusing accuracy, and to suppress unnecessary stop limitation.

Third Embodiment

A third embodiment of the technique of the present disclosure will be described. The configuration of the imaging device 10 according to the embodiment is the same as that of the first embodiment (refer to FIGS. 1 and 2), and thus the description thereof will be omitted.

Figure 14:
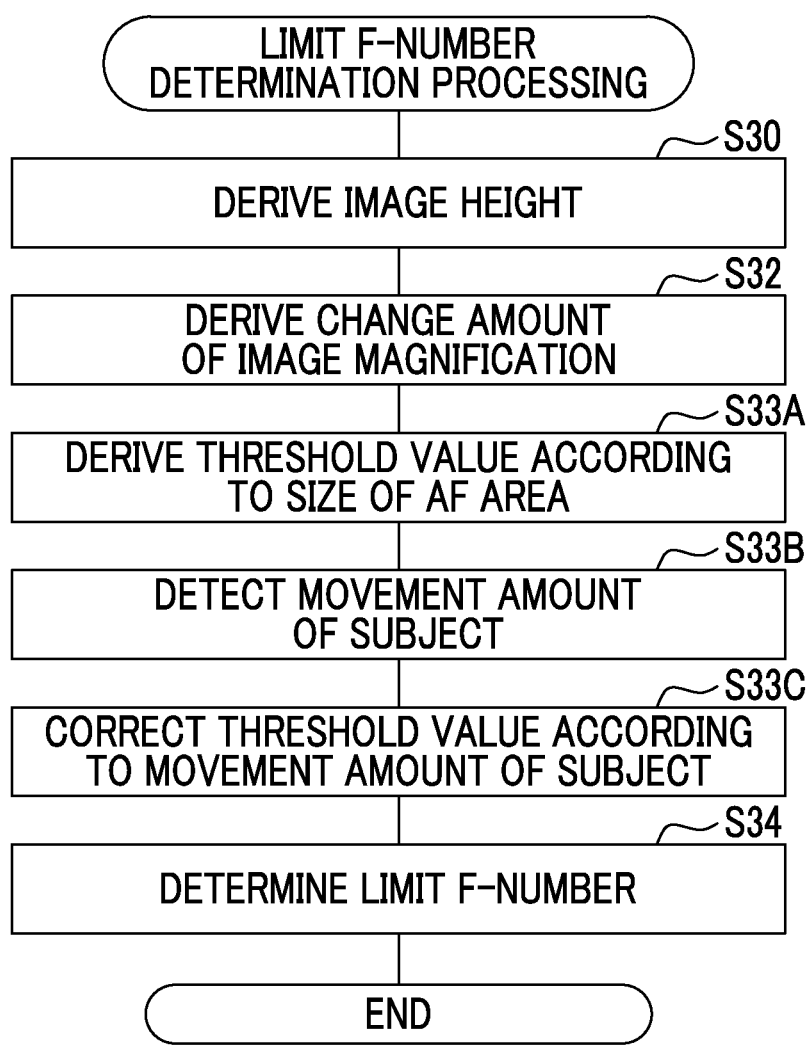
FIG. 14 is a flowchart illustrating an example of limit F-number determination processing according to a third embodiment.

The operation of the imaging device 10 according to the embodiment will be described with reference to FIG. 14. Since the AF control processing according to the embodiment is the same as the AF control processing according to the second embodiment except for limit F-number determination processing of step S14, the limit F-number determination processing will be described here. In FIG. 14, a step executing the same processing as that in FIG. 13 is denoted by the same step number as that in FIG. 13, and the description thereof will be omitted. In the embodiment, the CPU 60 executes the imaging program 98 to further operate as a detection unit that detects a movement amount of the subject before executing autofocus.

In step S33B of FIG. 14, the CPU 60 derives a motion vector of the subject at a plurality of positions in the live view image, using image data for a plurality of live view images. As a method of deriving the motion vector of the subject, for example, a method disclosed in JP5507014B can be applied. The CPU 60 detects the maximum value of the size of the derived motion vectors of the subject at the plurality of positions, as a movement amount of the subject.

In step S33C, the CPU 60 corrects the threshold value TH1 according to the movement amount of the subject according to following Expression (4).

$$TH1 = TH1 \times (1 - K \times X\_max) \quad (4)$$

TH1 on the right side of Expression (4) represents the threshold value TH1 derived by the processing of step S33A, and X_max represents the movement amount of the subject detected by the processing of step S33B. Further, in Expression (4), K is a predetermined coefficient, and is determined according to the assumed upper limit of the movement amount of the subject, in the embodiment. For example, in a case where the assumed upper limit of the movement amount of the subject is the same as the length of the AF area in the horizontal direction, K is a value of about 50% of the length of the AF area in the horizontal direction. Accordingly, in the embodiment, the threshold value TH1 is smaller as the movement amount of the subject before execution of AF is greater. In the processing of step S34, the threshold value TH1 derived in step S33C is used, and the limit F-number is determined. In step S34, in a case where the threshold value TH1 is smaller than the minimum value of the change amount of the image magnification derived by the processing of step S32, the F-number (in the example of FIG. 11, F2.0) corresponding to the minimum value of the change amount of the image magnification may be determined as the limit F-number.

As described above, according to the embodiment, the threshold value TH1 is smaller as the movement amount of the subject before execution of AF is greater. Accordingly, since the influence of the change in position of the focus lens 74 is reduced as the movement amount of the subject is greater, the subject is less likely to get out of the AF area, and as a result, it is possible to further suppress a decrease in focusing accuracy.

Fourth Embodiment

A fourth embodiment of the technique of the present disclosure will be described. The configuration of the imaging device 10 according to the embodiment is the same as that of the first embodiment (refer to FIGS. 1 and 2), and thus the description thereof will be omitted.

Figure 15:
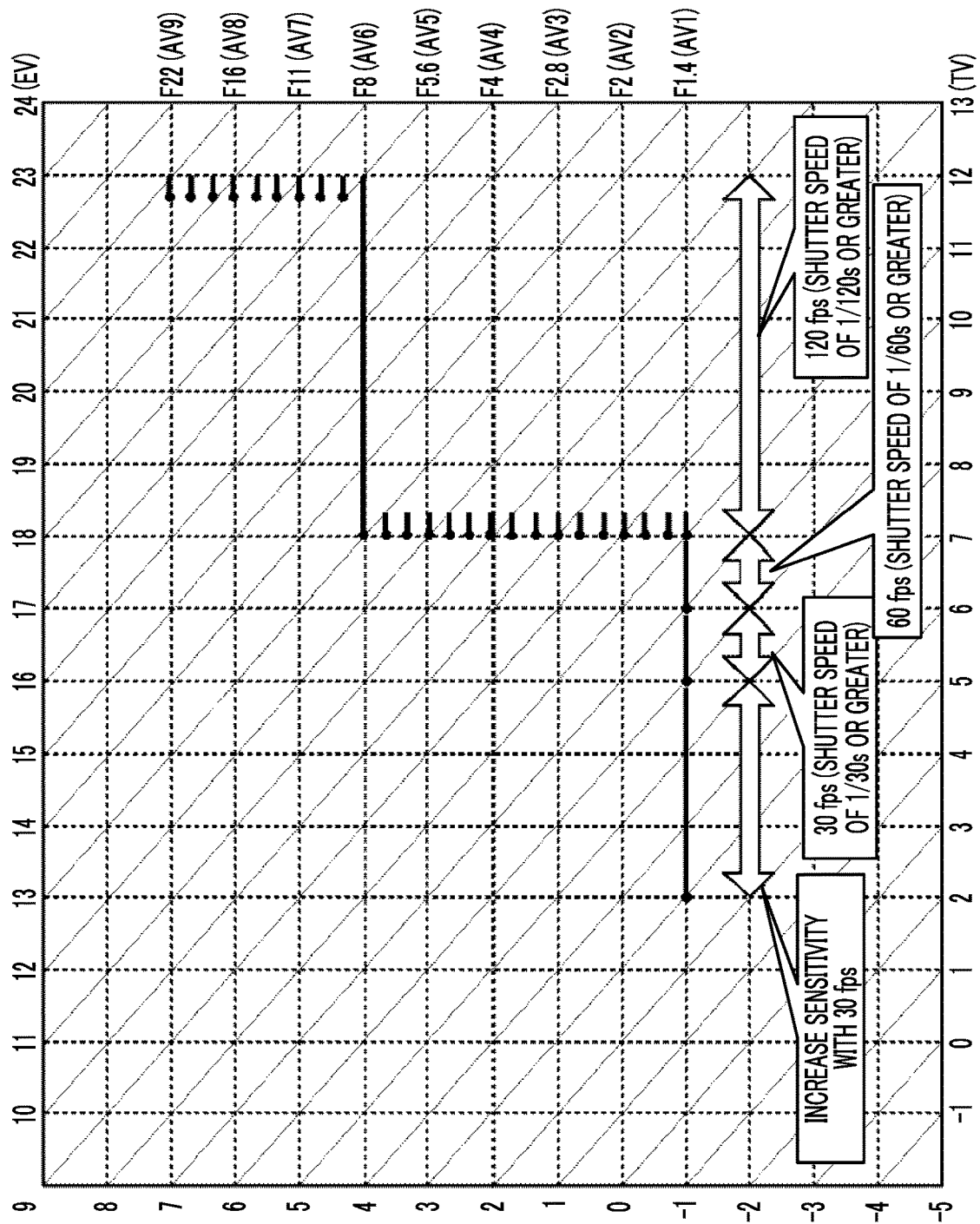
FIG. 15 is an example of an AF program chart in a case where an AF operation mode is a mode in which speed is emphasized, according to a fourth embodiment.

As a method of determining the exposure state in the AF, a method using an AF program chart is known. In this method, the F-number, the shutter speed, and the sensitivity in AF are determined using the program chart on the basis of the photometric value (exposure value (EV) value) of the subject. In a case where the AF operation mode is a mode in which speed of the AF is prioritized, for example, as illustrated in FIG. 15, as the EV value is decreased, the shutter speed is maintained while switching the stop to the open side, and the frame rate in a case of searching the focusing position by the AF (hereinafter, referred to as "AF frame rate") is not reduced. Here, the AF frame rate means a time interval for acquiring the AF evaluation value in a case of searching the focusing position by the AF. Further, FIG. 15 illustrates an example of a case in which the F-number in a case of imaging is F8.

Figure 16:
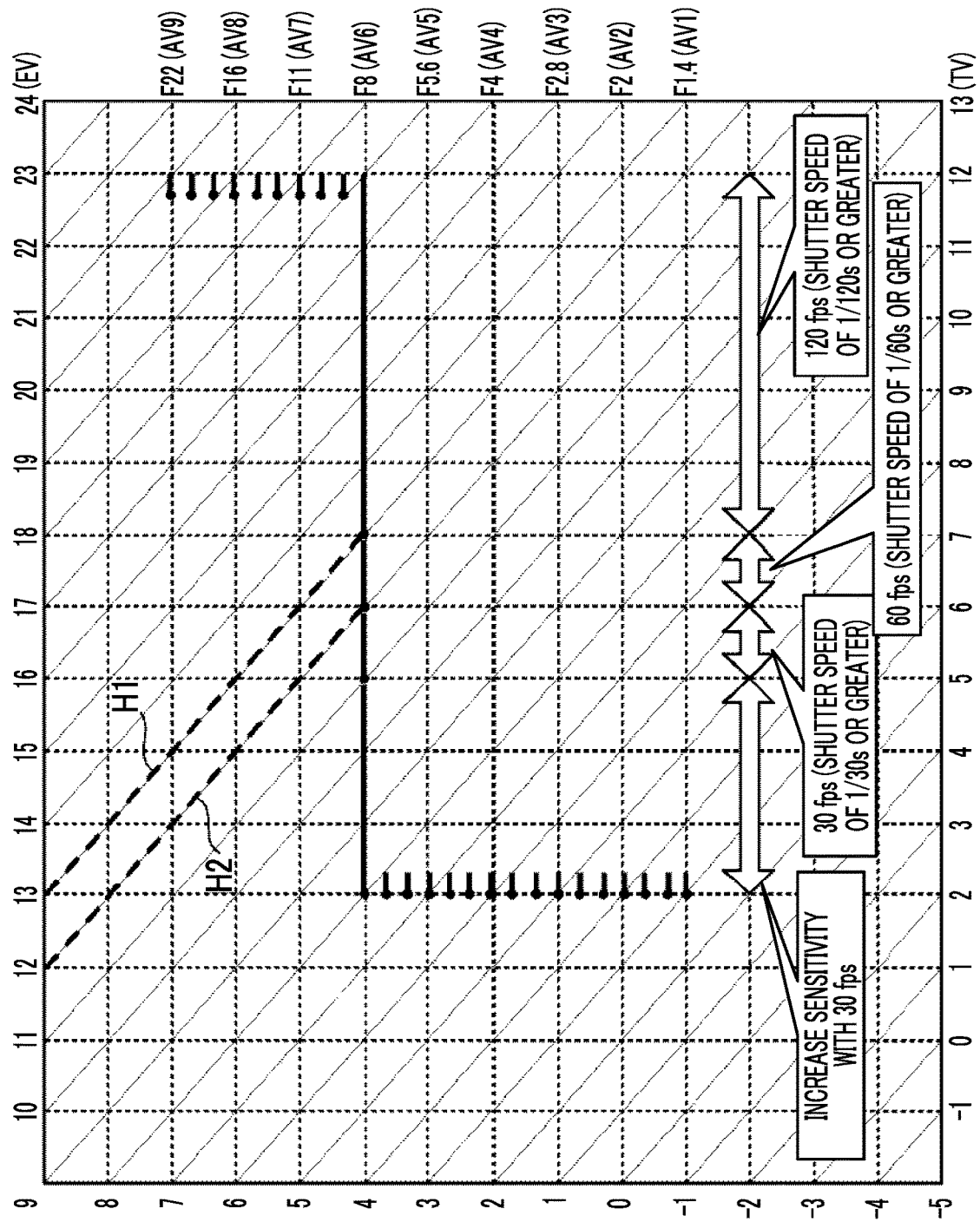
FIG. 16 is an example of an AF program chart in a case where the AF operation mode is a mode that emphasizes focusing accuracy, according to the fourth embodiment.

On the other hand, in a case where the AF operation mode is a mode in which focusing accuracy is prioritized (hereinafter, referred to as "accuracy priority mode"), for example, as illustrated in FIG. 16, even in a case where the EV value is smaller, the shutter speed is reduced with the same stop and the AF frame rate is also reduced in order to maintain the stop in a case of imaging as much as possible. FIG. 16 illustrates an example of a case in which the F-number in a case of imaging is F8. In the example illustrated in FIG. 16, as indicated by a broken line H1, the AF frame rate is switched between 120 fps (frames per second) and 60 fps with 13 EV as a boundary. Further, in this case, as indicated by a broken line H2, the AF frame rate is switched between 60 fps and 30 fps with 12 EV as a boundary.

In a case where a subject is moving, the subject is likely to get out of the AF area as the AF frame rate is lower. Thus, in the embodiment, in a case where the AF operation mode is the accuracy priority mode, the threshold value TH1 is changed according to the AF frame rate.

Figure 17:
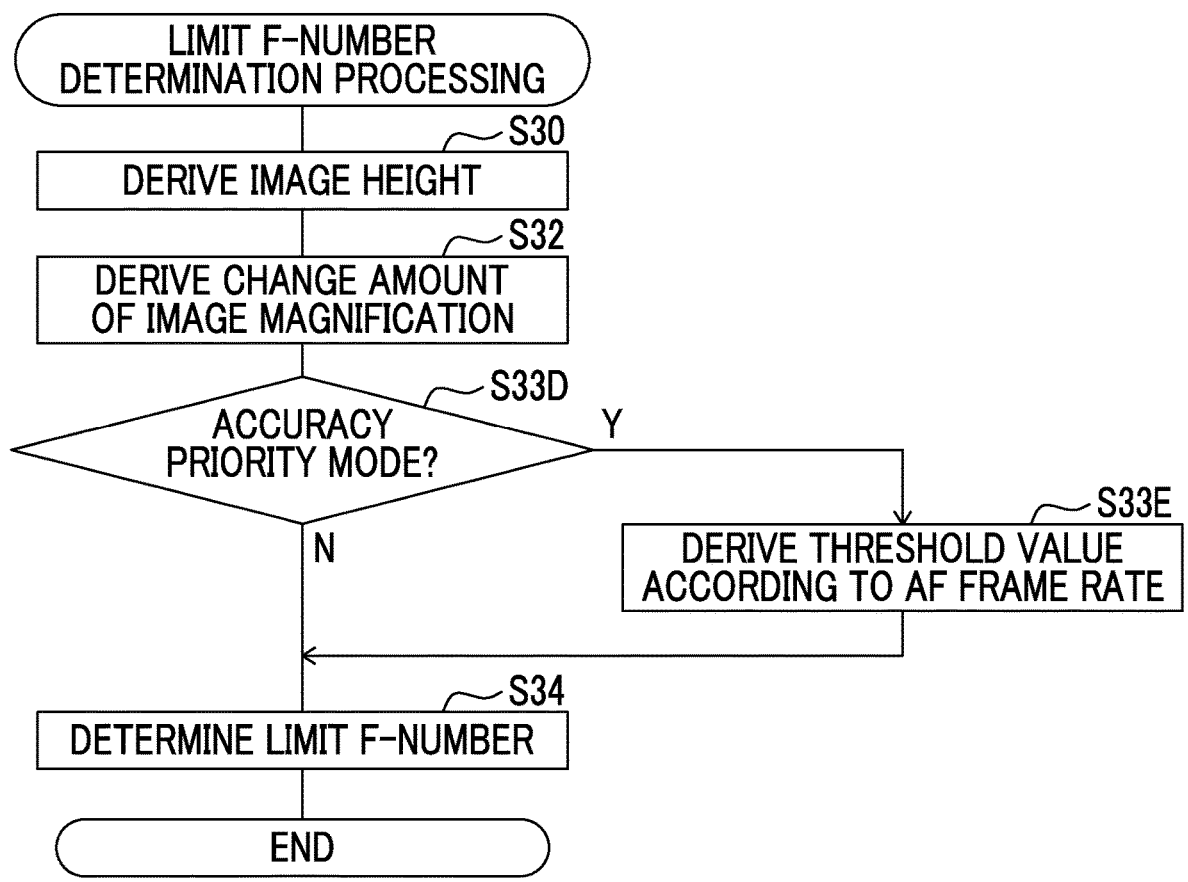
FIG. 17 is a flowchart illustrating an example of limit F-number determination processing according to the fourth embodiment.

The operation of the imaging device 10 according to the embodiment will be described with reference to FIG. 17. Since the AF control processing according to the embodiment is the same as the AF control processing according to the first embodiment except for limit F-number determination processing of step S14, the limit F-number determination processing will be described here. In FIG. 17, a step executing the same processing as that in FIG. 9 is denoted by the same step number as that in FIG. 9, and the description thereof will be omitted. In the embodiment, the CPU 60 executes the imaging program 98 to further operate as a determination unit that determines whether the AF operation mode is the accuracy priority mode.

In step S33D of FIG. 17, the CPU 60 determines whether the AF operation mode is the accuracy priority mode. In a case where the determination is negative, the processing proceeds to step S34, and in a case where the determination is affirmative, the processing proceeds to step S33E.

In step S33E, the CPU 60 derives the threshold value TH1 according to the AF frame rate according to following Expression (5).

$$TH1 = TH1 \times AF\text{frame rate} \div \text{reference frame rate} \quad (5)$$

TH1 on the right side of Expression (5) represents a predetermined (that is, default) threshold value similarly to the first embodiment. Further, the reference frame rate in Expression (5) is a frame rate determined as a reference value for the AF frame rate in advance, and is 120 fps, for example. Accordingly, in the embodiment, the threshold value TH1 is greater as the AF frame rate is greater. In a case where the processing of step S33E is ended, the processing proceeds to step S34. In a case where the AF operation mode is the accuracy priority mode, in the processing of step S34, the threshold value TH1 derived in step S33E is used, and the limit F-number is determined. On the other hand, in a case where the AF operation mode is a mode other than the accuracy priority mode (for example, a mode in which speed of the AF is prioritized), in the processing of step S34, the predetermined threshold value TH1 is used and the limit F-number is determined similarly to the first embodiment.

As described above, according to the embodiment, in a case where the AF operation mode is the accuracy priority mode, the threshold value TH1 is greater as the AF frame rate is greater. Accordingly, the subject is less likely to get out of the AF area, and as a result, it is possible to suppress a decrease in focusing accuracy.

Fifth Embodiment

A fifth embodiment of the technique of the present disclosure will be described. The configuration of the imaging device 10 according to the embodiment is the same as that of the first embodiment (refer to FIGS. 1 and 2), and thus the description thereof will be omitted.

Figure 18:
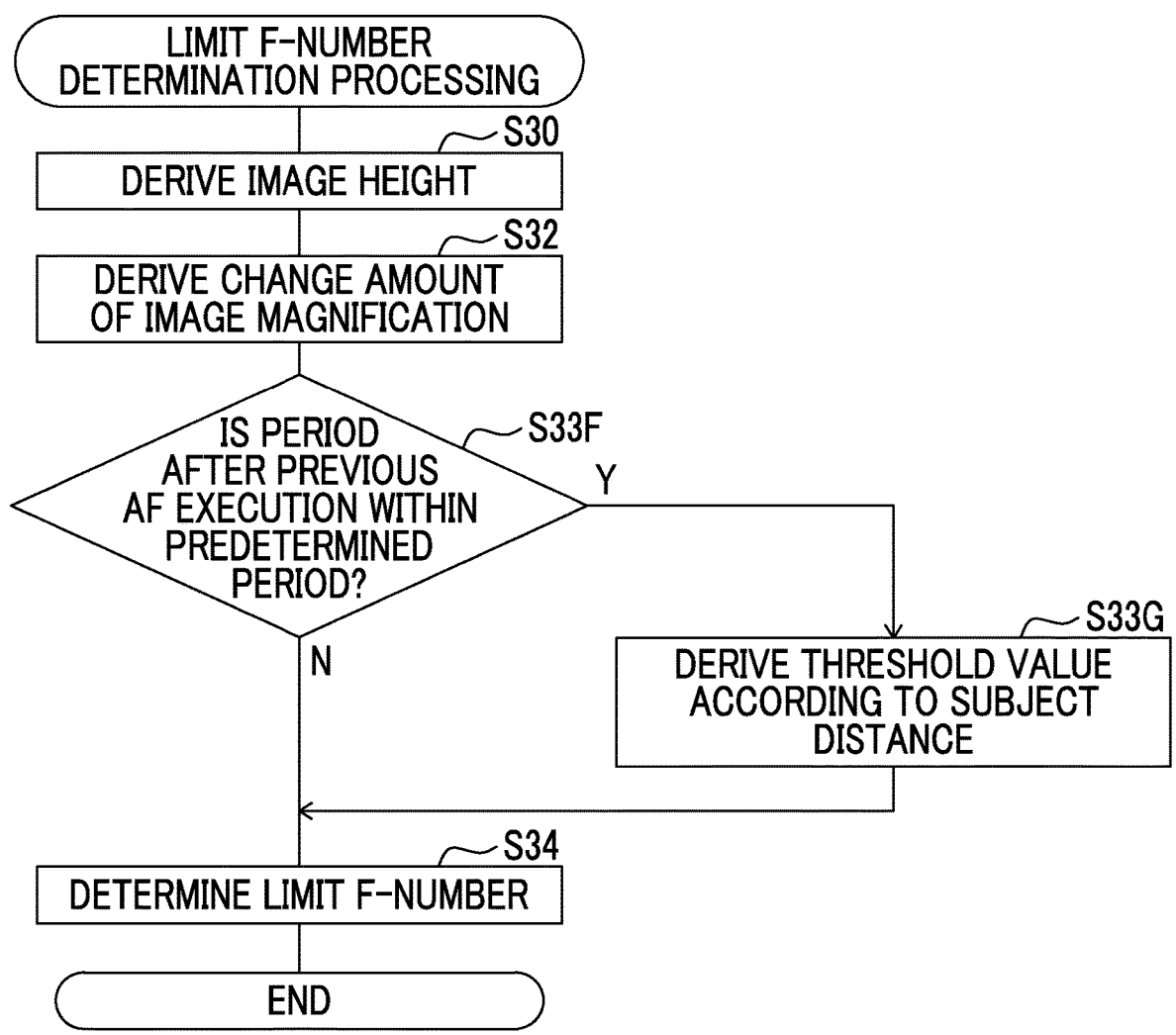
FIG. 18 is a flowchart illustrating an example of limit F-number determination processing according to a fifth embodiment.

The operation of the imaging device 10 according to the embodiment will be described with reference to FIG. 18. Since the AF control processing according to the embodiment is the same as the AF control processing according to the first embodiment except for limit F-number determination processing of step S14, the limit F-number determination processing will be described here. In FIG. 18, a step executing the same processing as that in FIG. 9 is denoted by the same step number as that in FIG. 9, and the description thereof will be omitted.

In step S33F of FIG. 18, the CPU 60 determines whether a period elapsed after the AF is previously executed is within a predetermined period (for example, 10 seconds). In a case where the determination is negative, the processing proceeds to step S34, and in a case where the determination is affirmative, the processing proceeds to step S33G. This is because that it is assumed that in a case where the period elapsed after the AF is previously executed is relatively short, the same subject as that in a case of the previous AF execution is imaged in a state where the subject distance is almost unchanged.

Figure 19:
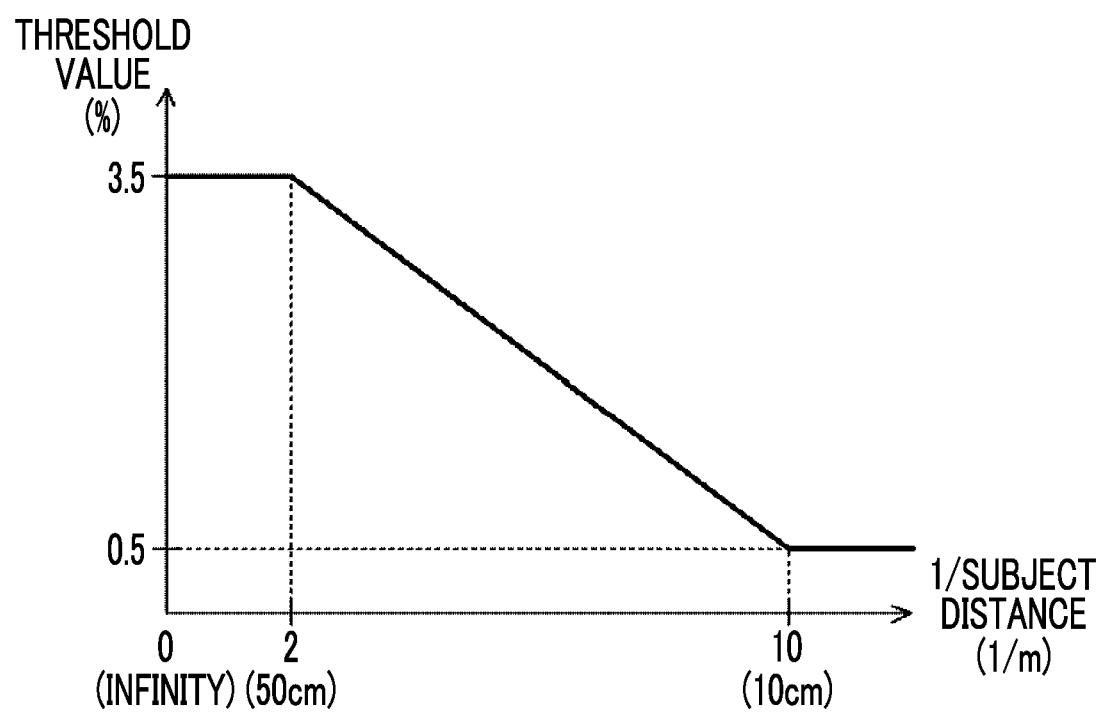
FIG. 19 is a graph for describing processing of deriving a threshold value according to the fifth embodiment.

In step S33G, the CPU 60 derives the threshold value TH1 to be smaller as the subject distance in a case of the previous AF execution is shorter. Specifically, for example, as illustrated in FIG. 19, the CPU 60 sets the threshold value TH1 to a value smaller than the default value (3.5% in the embodiment) as the subject distance is shorter within a range between the lower limit and the upper limit of the subject distance. The description in the parentheses in the lateral axis of FIG. 19 represents the subject distance in a case of the previous AF execution. The embodiment is based on the standard lens (imaging lens with 50 mm focal length in 35 mm conversion). In a case where the processing of step S33G is ended, the processing proceeds to step S34. In a case where the period elapsed after the AF is previously executed is within the predetermined period, in the processing of step S34, the threshold value TH1 derived in step S33G is used, and the limit F-number is determined. On the other hand, in a case where the period elapsed after the AF is previously executed exceeds the predetermined period, in the processing of step S34, the predetermined threshold value TH1 is used and the limit F-number is determined similarly to the first embodiment.

As described above, according to the embodiment, the threshold value TH1 is smaller as the subject distance in a case of the previous AF execution is shorter. Accordingly, the subject is less likely to get out of the AF area, and as a result, it is possible to suppress a decrease in focusing accuracy.

In the fifth embodiment, the lower limit and the upper limit (10 cm and 50 cm in the example of FIG. 19) of the subject distance in a range where the threshold value TH1 is to be changed may be greater as the focal length of the imaging lens 14 is longer. Since the influence of the movement of the subject and the blur of the imaging device 10 is increased as the focal length of the imaging lens 14 is longer, the subject is less likely to get out of the AF area by changing the lower limit and the upper limit according to the focal length, and as a result, it is possible to further suppress a decrease in focusing accuracy.

Further, in the fifth embodiment, an aspect of changing the threshold value TH1 in a case where the period elapsed after the AF is previously executed is within the predetermined period has been described, but the invention is not limited thereto. For example, an aspect of changing the threshold value TH1 in a case where a similarity between a result of AE execution in a case where the AF is executed previously and a result of the current AE execution is equal to or greater than a predetermined degree may be adopted. In this case, an aspect of deriving the similarity using at least one of the distribution of photometric values in areas obtained by dividing the imaging angle of view or photometric values of the entire imaging angle of view in the AE is exemplified.

In addition, the AF control processing executed by the CPU executing software (program) in each embodiment described above may be executed by various processors other than the CPU. As the various processors in this case, a programmable logic device (PLD) of which the circuit configuration can be changed after manufacture, such as a field-programmable gate array (FPGA), and a dedicated electrical circuitry, which is a processor having a circuit configuration designed exclusively to execute specific processing, such as an application specific integrated circuit (ASIC) are exemplified. Further, the AF control processing may be executed by one of the various processors, or executed by the combination of the same or different kinds of two or more processors (for example, combination of a plurality of FPGAs, combination of the CPU and the FPGA, or the like). Furthermore, the hardware structures of the various processors are more specifically electrical circuitry where circuit elements, such as semiconductor elements, are combined.

In the embodiments described above, an aspect in which the imaging program 98 is stored (installed) in the secondary storage unit 64 in advance is described, but the present invention is not limited thereto. The imaging program 98 may be provided by being recorded in a recording medium such as a compact disk read only memory (CD-ROM), a digital versatile disk read only memory (DVD-ROM), and a Universal Serial Bus (USB) memory. In addition, the imaging program 98 may be downloaded from external devices via a network.

The disclosure of JP2018-010738 filed on Jan. 25, 2018 is incorporated herein by reference in its entirety. All documents, patent applications, and technical standards disclosed in this specification are incorporated in this specification by reference to the same extent as if the documents, the patent applications, and the technical standards were specifically and individually stated to be incorporated by reference.

What is claimed is:

1. An imaging device comprising:
   an imaging lens including a focus lens;
   an imaging sensor that captures an optical image that has passed through the imaging lens; and
   a processor,
   wherein the processor is configured to execute a process comprising:
   acquiring a reference value of a change amount of image magnification in accordance with a change in position of the focus lens for each of a plurality of F-numbers;
   deriving a change amount of image magnification corresponding to each of the plurality of F-numbers in an autofocus area based on the acquired reference value of the change amount, in a case in which autofocus is executed;
   determining, as a limit F-number, an F-number corresponding to any change amount equal to or less than a threshold value of an allowed change amount of the image magnification among the derived change amounts; and
   setting an F-number as the limit F-number in a case in which an F-number obtained from a subject luminance in a case in which autofocus is executed exceeds the determined limit F-number.

2. The imaging device according to claim 1,
   wherein the threshold value is greater as a size of the autofocus area is greater.

3. The imaging device according to claim 1,
   wherein the process further comprises:
   detecting a movement amount of a subject before execution of autofocus, and
   wherein the threshold value becomes smaller as the detected movement amount of the subject becomes greater.

4. The imaging device according to claim 1,
   wherein the threshold value becomes greater, as a frame rate when searching for a focusing position by autofocus becomes greater.

5. The imaging device according to claim 4,
   wherein, in a case in which an operation mode of autofocus is a mode in which focusing accuracy is prioritized, the threshold value becomes greater as the frame rate becomes greater.

6. The imaging device according to claim 1,
   wherein the threshold value becomes smaller as a subject distance when autofocus was previously executed becomes shorter.

7. The imaging device according to claim 6,
   wherein, in a case in which the threshold value becomes smaller as the subject distance becomes shorter within a range between a lower limit and an upper limit of the subject distance, the lower limit and the upper limit become greater as a focal length of the imaging lens becomes longer.

8. The imaging device according to claim 6,
   wherein, in a case in which a similarity between an execution result of auto exposure when autofocus was previously executed and an execution result of current auto exposure is equal to or greater than a predetermined degree, the threshold value becomes smaller as the subject distance becomes shorter.

9. The imaging device according to claim 1,
   wherein the processor determines, as the limit F-number, an F-number which is equal to or less than the threshold value and corresponds to a maximum change amount, among the derived change amounts.

10. An imaging method executed by an imaging device provided with an imaging lens including a focus lens, and an imaging sensor that captures an optical image that has passed through the imaging lens, the imaging method comprising:
    acquiring a reference value of a change amount of image magnification in accordance with a change in position of the focus lens for each of a plurality of F-numbers;
    deriving a change amount of image magnification corresponding to each of the plurality of F-numbers in an autofocus area based on the acquired reference value of the change amount, in a case in which autofocus is executed;
    determining, as a limit F-number, an F-number corresponding to any change amount equal to or less than a threshold value of an allowed change amount of the image magnification among the derived change amounts; and
    setting an F-number as the limit F-number in a case in which an F-number obtained from a subject luminance in a case in which autofocus is executed exceeds the determined limit F-number.

11. A non-transitory computer-readable storage medium storing a program executable by a computer that controls an imaging device provided with an imaging lens including a focus lens, and an imaging sensor that captures an optical image that has passed through the imaging lens, to perform a process comprising:

acquiring a reference value of a change amount of image magnification in accordance with a change in position of the focus lens for each of a plurality of F-numbers;

deriving a change amount of image magnification corresponding to each of the plurality of F-numbers in an autofocus area based on the acquired reference value of the change amount, in a case in which autofocus is executed;

determining, as a limit F-number, an F-number corresponding to any change amount equal to or less than a threshold value of an allowed change amount of the image magnification among the derived change amounts; and setting an F-number as the limit F-number in a case in which an F-number obtained from a subject luminance in a case in which autofocus is executed exceeds the determined limit F-number.

* * * * *